June 11, 1963   A. W. FRENCH   3,093,065
EXPRESSING PRESS

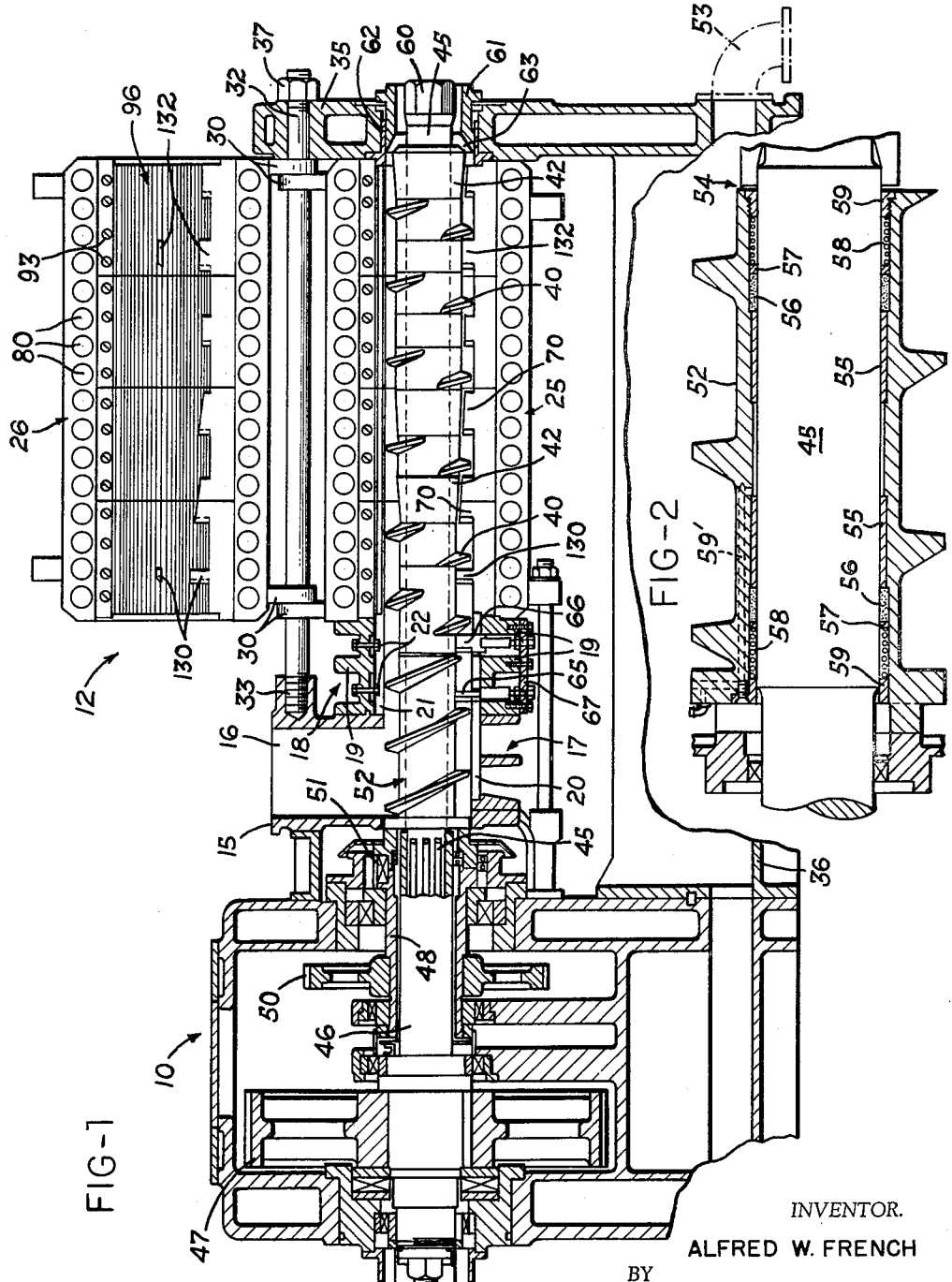

Filed Nov. 25, 1957   3 Sheets-Sheet 2

INVENTOR.
ALFRED W. FRENCH
BY
Marechal, Biebel, French & Bugg
ATTORNEYS

June 11, 1963  A. W. FRENCH  3,093,065
EXPRESSING PRESS
Filed Nov. 25, 1957  3 Sheets-Sheet 3
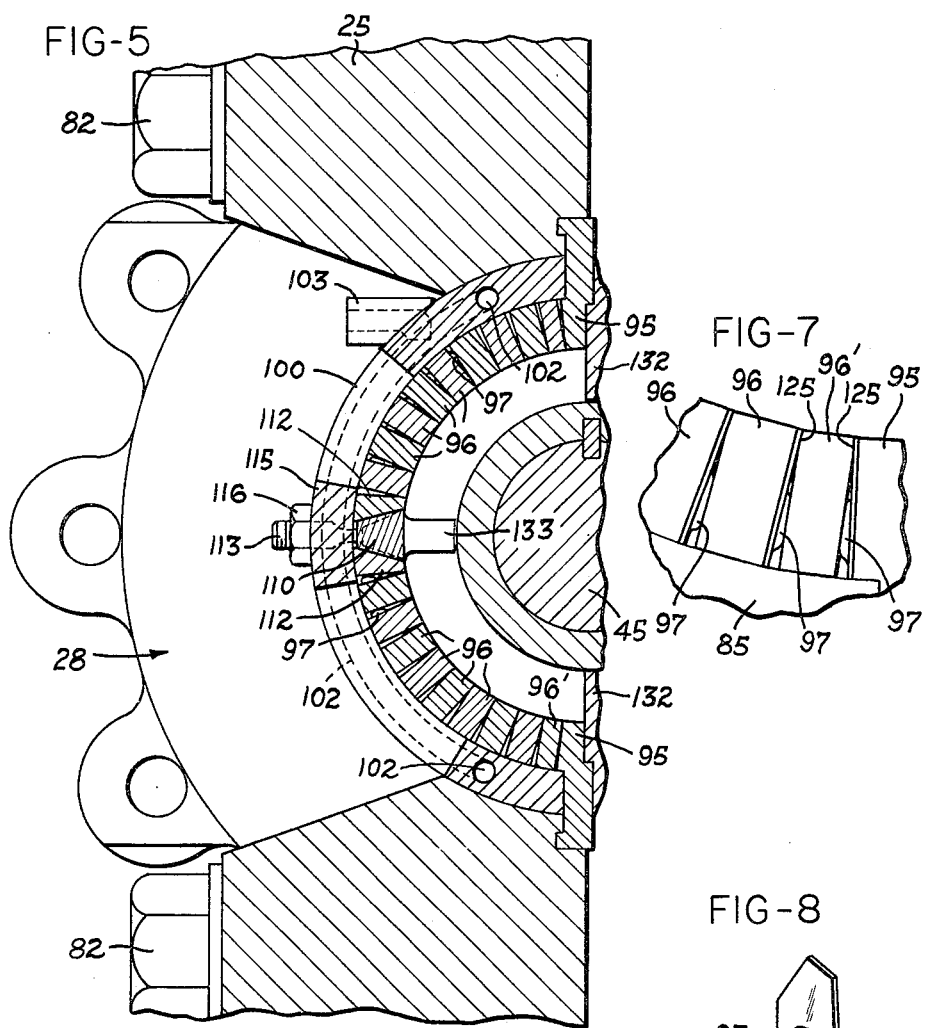
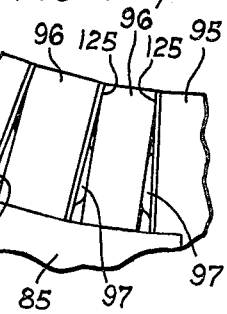
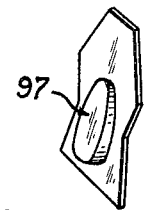
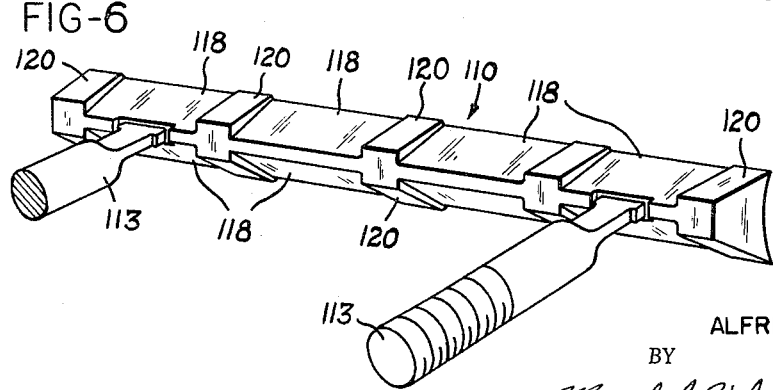
INVENTOR.
ALFRED W. FRENCH
BY
Marechal, Biebel, French & Bugg
ATTORNEYS United States Patent Office 3,093,065
Patented June 11, 1963

3,093,065
EXPRESSING PRESS
Alfred W. French, Piqua, Ohio, assignor to The French Oil Mill Machinery Company, Piqua, Ohio, a corporation of Ohio
Filed Nov. 25, 1957, Ser. No. 698,442
3 Claims. (Cl. 100—127)

This application relates to a screw type expressing press, and particularly to an improved cage construction for such a press.

The primary object of the invention is to provide a cage construction for a screw type expressing press utilizing a plurality of sub-assembly units supported within an outer main cage structure, wherein the individual sub-assemblies may be removed intact from the main cage for repair or replacement of parts.

A further object of the invention is to provide in such a press cage construction for interchange of parts of the cage structure and thereby to facilitate servicing of the press as well as standardizing construction thereof.

As an additional object the present invention also provides for interchange of press parts having a different function, particularly for the selective addition and/or removal of a cooling unit in the press, thereby further standardizing construction thereof while providing for cooling of the press parts in those applications of the press where such cooling is required.

The present invention also has as one of its objects the provision of novel support structure for the main shaft and main feed screw of the press, which support relieves the drive connection to the shaft of some of the loading which otherwise is imposed thereon, in the nature of a cantilever beam, by the weight of the entire length of the shaft and worms, and the transverse forces exerted thereon.

A further object of this invention is to provide an improved feed screw construction in a screw-type expressing press for sealing off the drive section from the interior of the press, thus preventing the passage of expressed fluid into the drive case.

Another object of the invention is to provide an improved wedge bar construction for retaining screen bars tightly within the press cage while affording maximum drainage area.

Additional objects and advantages of the invention will be apparent from the following description, the accompanying drawings and the appended claims.

In the drawings—

FIG. 1 is a vertical section taken through a screw type expressing press embodying the features of the present invention, and with one of the cage parts swung into an open position;

FIG. 2 is an enlarged detail view, partly in section and partly in elevation, of the feed worm shown in FIG. 1;

FIG. 5 is a view similar to FIG. 3 showing a modified form of the invention;

FIG. 6 is a detail perspective view of an improved wedge bar construction included in the modified form of FIG. 5;

FIG. 7 is an enlarged detail section of a portion of the cage assembly in FIG. 3, showing a special end screen bar provided by the invention; and FIG. 8 is an enlarged perspective view of the type of spacer inserted between adjacent screen bars to provide drainage space.

Figure 3:
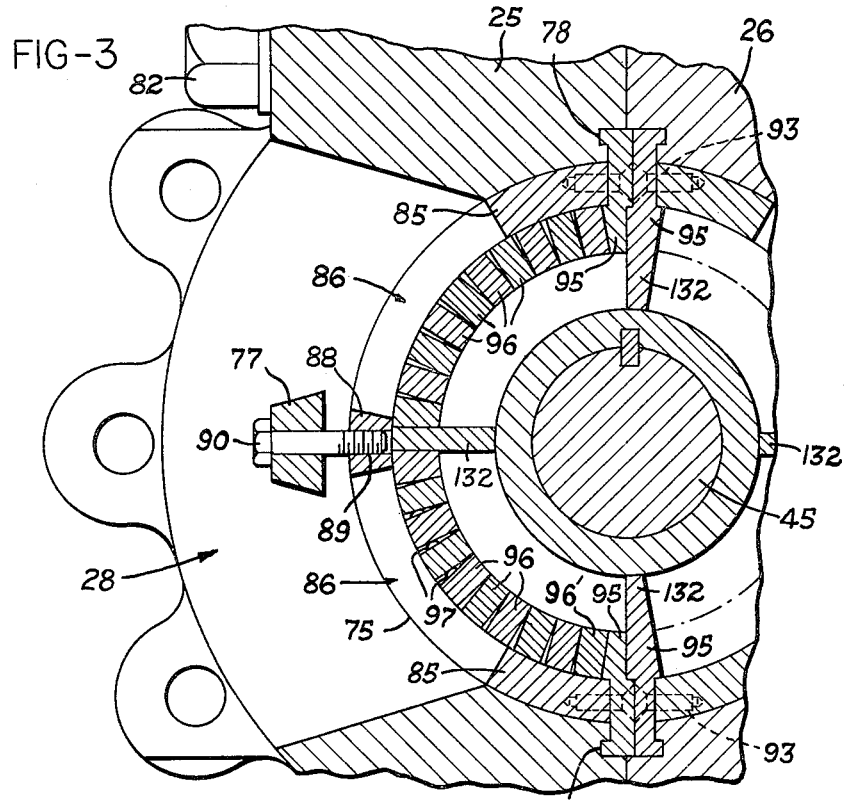
FIG. 3 is a broken sectional view on an enlarged scale, taken transversely through the cage of the press shown in FIG. 1, with the cage sections closed and the worm omitted for clarity.

Referring to the drawings, which illustrate preferred embodiments of the invention, and particularly to FIG. 1, the press includes a drive section indicated generally at 10 and an expression section shown generally at 12. The expression section includes an inlet housing or hopper 15 having a generally vertically extending passage 16 for receiving material to be treated in the press, and a ribbed bottom section 17. An extension cage 18 extends from the lower end of housing 15 and section 17, said cage and bottom section both having radial ribs 19 surrounding and defining drainage openings in the walls thereof, and supporting a number of screen bars 20 which are arranged side by side within cage 18 and bottom section 17, extending generally longitudinally thereof. Screen bars 20 are slightly separated by suitable spacers, and thus define openings between them of reduced cross-sectional area. Wedge bars 21, fastened to cage 18 by bolts 22, serve to retain the screen bars 20 in place.

Figure 4:
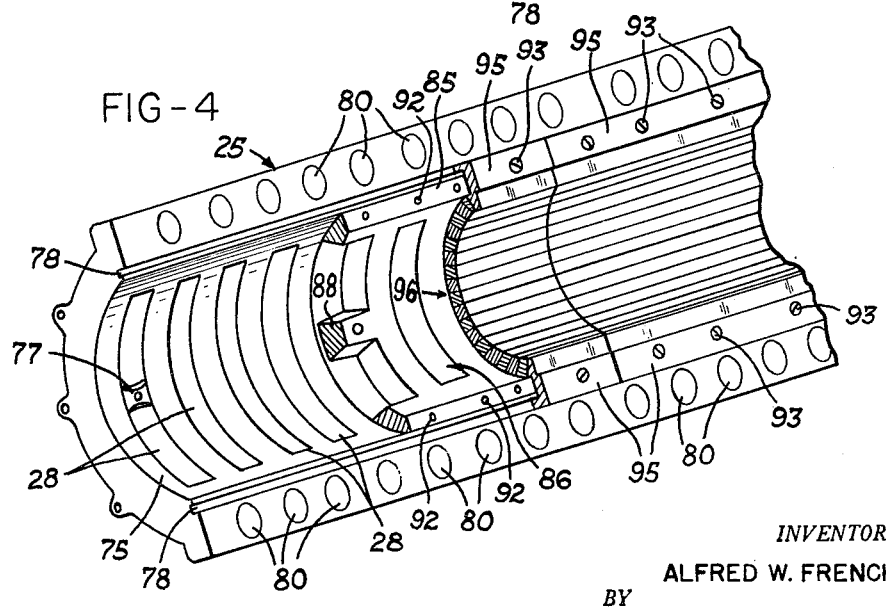
FIG. 4 is a somewhat schematic perspective view of a press cage section with parts broken away to show the overall built-up cage construction.

The main press cage extends from the end of auxiliary cage 18 and includes a pair of complementary parts 25 and 26 each of which is of generally semi-cylindrical shape having a ribbed outer surface, as more clearly shown in FIG. 4, and each of which includes a plurality of radially extending drainage openings 28 between the ribs, these openings being shown in the cage part 25 in FIG. 4. It is understood that the cage part 26 is provided with similar such openings, although they are not shown in the drawings. These cage parts include upper hinge ears 30 received on a long tie bolt 32 which is threaded at one end 33 into inlet housing 15, and which extends at its outer end through the outlet end housing 35 of the press bed 36, being secured therein by a nut 37. The tie bolt 32 thus also serves as a hinge pin for the two parts of the main press cage.

The press includes a conventional arrangement of alternately arranged worms 40 and pressure collars 42 keyed on a main shaft 45 which is driven through a connecting sleeve 46 by a main drive gear 47 keyed to the sleeve. The main drive shaft extends coaxially within a feed drive spindle or sleeve 48 driven by a feed drive gear 50. Spindle 48 in turn drives the feed worm 52 through a dog pin 51. A suitable drive motor and pinions are arranged to drive the gears 47 and 50, but since the particular drive arrangement forms no part of the present invention, details of the drive have not been shown beyond those illustrated in FIG. 1. It will be understood, however, that the gearing is so selected that the drive spindle 48, and therefore feed worm 52, rotates at greater speed than the main drive shaft 45, the ratio of speed generally being about four to one. This provides for packing of the material into the entrance auxiliary cage 18 with resultant preliminary expression of fluids from the material at this point. The fluids flow between the screen bars 20 in the usual manner and fall into the bed structure 36 from whence they may pass through a suitable outlet 53.

Due to the speed differential between feed worm 52 and main shaft 45, clearance must be provided between the feed worm and the first worm on the main shaft, as indicated by reference numeral 54 in FIG. 2. Fluid pressure is developed at this point and some liquid has been expressed, and the pressure in some cases may be sufficient to force expressed liquid under the feed worm, to pass between that worm and shaft 45 backwardly toward the drive section. In some instances, for example when the expressed liquid is corrosive, the presence of expressed liquid at this point is undesirable since it may cause corrosion of the drive gears and contamination of the lubricating oil in the drive section. Therefore, in accordance with this invention the shaft 45 and feed worm 52 are arranged in the usual coaxial fashion, separated by bearing sleeves 55 which provide for relative rotation thereof, and at each end of the feed worm axially outwardly from bearings 55 are rotary seals including packing rings 56, pressure rings 57, pressure springs 58 and glands 59. Lubricant may be introduced to bearings 55 around the rotary seals through the passage 59'. This arrangement provides an effective seal preventing passage of expressed liquid rearwardly into the drive section of the press as mentioned above.

As previously stated, the feed worms 40 and pressure collars 42 are suitably keyed to main shaft 45 for rotation therewith, and they are held in place upon the shaft by an end nut 60. At the discharge end of the press a stationary discharge collar 61 is mounted in surrounding relation with the last collar 42, preferably for axially slidable movement within a bushing 62, to define a variable discharge orifice 63.

As material is forced into the press by feed worm 52 the resultant caked and compressed material is initially engaged by a first breaker bar or lug 65 extending through an aperture in screen bars 20 and spaced slightly from the shaft part of feed worm 52 between successive flights on said worm. A second breaker bar 66 acts upon the caked material passing from the feed worm into the first worm section 40 of the main part of the press. These first breaker bars 65 and 66 extending through the auxiliary cage 18, are supported in radially adjustable relation by the plate 67. Their construction is shown and described in greater detail in copending application Serial No. 631,698, filed December 31, 1956, now abandoned, assigned to the assignee of this application. From this point the material is fed through the press by the successive worm flights 40 which force the caked material toward the discharge, and as the material reaches each pressure collar 42 it leaves the preceding flight and passes over the tapered collar, being restrained from rotation therewith by breaker bar lugs 70 fixed within the main cage portions 25 and 26 and extending into closely spaced relation with the surface of the adjacent collar over substantially the entire axial extent thereof.

Briefly, the action of these lugs is to restrain rotation of the caked material and thus cause it to move in an axial direction over the tapered collar and to be compressed as it moves through the reducing cross-section of the passage through the press. In this manner extremely high mechanical pressure is exerted upon the material with resultant expression of substantial quantities of the fluid to be extracted therefrom, and the relatively dry residue or caked solid material is expelled through the adjustable discharge opening 63 and the discharge cone 61.

Referring particularly to FIGS. 3 and 4, the built-up cage structure provided by this invention includes the two main outer cage sections 25 and 26, the former of which is shown in detail in FIG. 4 as including a central longitudinally extending passage formed by a semi-cylindrical wall 75 having therein the main cage drainage openings 28. Certain of these drainage openings are traversed by web portions 77 (FIG. 4), preferably formed as integral parts of the main cage section, and the opposite ends of the semi-cylindrical inner surface 75 terminate in slots 78 at the top and bottom of the cage section. A plurality of bolt holes 80 extend transversely through the upper and lower ends of the casing sections 25 and 26, and these holes receive cage bolts 82 which retain the two cage sections in closed position when the press is completely assembled.

A plurality of sleeve sections 85 are received within each of the main cage sections 25 and 26, there preferably being two sleeve sections 85 for each cage section, or a total of four sleeve sections which together form a complete insert sleeve covering the entire inner surface 75 of the main cage. The sleeve sections are, therefore, complementary in outer diameter to the inner diameter of the main cage, and each sleeve section includes drainage openings 86 substantially equal in number and size to the drainage openings 28 in the main cage. Webs 88 extend across the sleeve section openings 86 corresponding to the webs 77 on the outer main cage. These webs 88 are suitably drilled and tapped, as shown at 89 in FIG. 3, to receive connecting bolts 90 which extend through bolt holes 91 in the outer cage webs 77, these bolts serve to retain sleeve sections 85 within the main cage.

The opposite ends of each sleeve section 85 are provided with suitable tapped bolt holes 92 for receiving center bar bolts 93, which in turn retain a center bar 95 along each end of a sleeve section 85, with the projecting outward edges of center bars 95 being received within the slots 78 on the main cage section. Certain of the center bars include the breaker lugs 70 as integral extensions, as shown particularly in FIG. 1.

These center bars act as clamps for retaining a plurality of screen bars 96 extending in stacked side by side relation longitudinally of each sleeve section 85. In the preferred embodiments there are two sets of stacked screen bars, and associated center bars 95, within each sleeve section 85, but obviously this arrangement could be varied as desired. The screen bars 96 are separated slightly from each other by suitable spacers 97 (FIGS. 3 and 8) and thus define drainage openings between the screen bars of reduced cross-section, providing for passage of the expressed fluids from the press while retaining the solid parts within the press cage.

One of the important features of this invention is the above described built-up arrangement of insert sleeve and screen bar lining for a press cage. With the present construction it is possible to remove a complete sleeve section 85 and its associated screen bars 96 and center bars 95 from the press as a sub-assembly, eliminating the necessity of individually removing the screen bars 96 for repair or replacement. By merely removing the bolts 90 the entire sub-assembly is freed from connection with the outer press cage, and may be removed from the outer cage and replaced by an identical sub-assembly, or the sub-assembly may be carried away to a place more suitable for repairing and/or replacing the parts thereof. This is particularly advantageous where down-time of the press must be kept at a minimum, since a complete sub-assembly may be kept on hand, and if breaker bar lugs 70 are broken off, or if certain of the screen bars are fractured, an entire sleeve section and its associated parts may be removed and replaced with an identical sub-assembly.

Another important feature of the present invention is the provision of modified sleeve sections 100 which are provided with internal passages 102 and fittings 103 (only one of which is shown in FIG. 5) to which a source of cooling liquid can be attached for circulation through passages 102. In operation of the press the high mechanical pressure exerted upon the material passing through the press, together with friction resulting from moving material across the irregular internal surface provided by the many adjacent surfaces of the screen bars 96, results in development of substantial frictional heat. In certain cases this heat of friction may have undesirable effects upon the material being treated, and it may be necessary to provide cooling. In accordance with this invention cooling sleeve sections 100 may be substituted in the sub-assemblies for the sleeve section 85, and with appropriate connections to a source of cooling water or the like a non-cooled press may be converted to one having cooling features, and the same castings may be used in manufacturing the major parts of the cage, whether or not it is for a press with a cooling jacket. It will be understood that the interior surface of the water cooling sleeve section 100 is lined with a plurality of screen bars 96 held in place by center bars 93 in the same manner as described above, and as shown in FIG. 5.

In connection with FIG. 5, a modified arrangement of mounting screen bars 96 also has been shown, and this modified arrangement may be used with either the water cooled sleeve section 100, together with which it is illustrated, or with the regular sleeve sections 85. The modification comprises essentially an improved wedge bar 110 of generally trapezoidal cross-section and associated filler bars 112 placed intermediate the ends of the sleeve section, fitted between the screen bars. Heretofore the addition of such wedge and filler bars resulted in loss of drainage area, since the surface of these members occupied a certain portion of the area of the cage interior, and contained no provision for drainage of expressed fluid. The purpose of the wedge bars is readily apparent from an inspection of FIG. 5, wherein the studs 113 extending from the body of wedge bar 110 are shown as passing through a suitable web 115 extending across an opening in the sleeve section, and these studs receive nuts 116 which clamp the wedge bars in place. Tightening of nuts 116 will draw the wedge bars 110 inwardly and cause the non-parallel sides thereof to exert lateral pressure upon screen bars 96 through filler bars 112.

Details of the wedge bar construction which forms a part of the present invention are shown in FIG. 6, where it will be seen that the tapered sides of the bar are cut away to form passages 118 bounded on opposite sides by raised surfaces 120 which engage the filler bars 112 in the assembly, as shown in FIG. 5, providing drainage passages at the cut away parts 118 between the wedge bar and filler bars. Of course, in addition the filler bars 112 are separated from the adjacent screen bars 96 by the usual spacers 97, and the resulting structure provides fluid passages between the filler bars and the adjacent screen bars on one side and the wedge bar 110 on the other side. This construction provides all the advantages of the ordinary wedge bar in securing the screen bars tightly in place, and at the same time use of the wedge bar does not materially reduce the total area of drainage openings in the press cage. Also, it will be noted that the wedge bars 110 are bolted to the cage sleeve section rather than to the main cage, and thus further contribute to the standardization of the cage construction by providing for a sub-assembly of the same type as described in connection with FIGS. 3 and 4, while incorporating the additional clamping action of the wedge bar where necessary.

Referring to FIG. 7, details of the cross-section of a special screen bar 96' provided by the invention are more clearly shown on the enlarged scale. This improved screen bar construction is particularly useful in providing more drainage space than was heretofore possible in press cage constructions. It will be noted that the conventional screen bars 96 are substantially rectangular in cross-section, and that they have one beveled corner or edge as clearly shown in FIG. 7. This provides for stacking of a plurality of such screen bars as shown in FIG. 3, with the spacers 97 in between to provide the required drainage space between screen bars. Heretofore, the last of the stack of screen bars presented a plane surface to one of the center bars 95, either at the top or bottom depending upon the way in which the stacking progressed. This joint between the two plane surfaces of such last screen bar and the center bar eliminated any drainage space at this point.

In accordance with this invention one screen bar, the special bar 96', is beveled at two edges 125, as shown in FIG. 7, and thus spacers 97 may be inserted between the screen bar 96' and the center bar 95, providing a drainage slot extending the full length of the cage where heretofore there was no drainage area.

Referring again to FIG. 1, it will be noted that the drive shaft 45, carrying the worms 40 and pressure collars 42, is supported from its connecting drive sleeve 46 in a manner similar to a cantilever beam. In addition to the weight of the collars and worms, there may at times be forces exerted in the press cage in a direction generally transverse to the longitudinal axis of shaft 45, and this allows a bending moment to be induced in the shaft which contributes to fatigue failures of the shaft. Because of the overall construction of the press, requiring a passage for the material through the cage, it is undesirable to use conventional bearings on the extended part of the main shaft or parts carried thereon, generally to the right of FIG. 1.

In accordance with this invention, however, a bearing arrangement which relieves some of this loading on the main shaft, is provided by extending certain of the breaker lugs so that the radially inward end of the lugs are almost in contact with their associated collars, the spacing being only great enough to provide a suitable running clearance. This feature is illustrated in FIG. 1 by the extended breaker lugs 130 adjacent the inlet end of the main worm, and further extended lugs 132 adjacent the discharge end of the worm. Preferably there are two additional such lugs other than the two extending from the center bars 95, and these are arranged generally at 90° with respect to the lugs on the center bars, being provided either as extensions from a suitable screen bar, as shown in FIG. 3, or as extension 133 on the wedge bars 110 when the latter are used, as shown in FIG. 5. The centering effect of these extended breaker lugs upon the main shaft will be apparent from a consideration of FIG. 3.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a screw press of the character described, the combination of a main vertically and longitudinally split drainage cage providing complementary cage parts, means supporting said main cage parts in normally assembled relation defining a longitudinal passage therethrough, an inner cage assembly including a tubular cage insert sleeve dimensioned to fit in said main cage passage and longitudinally split in the same direction as said main cage to provide insert sleeve sections corresponding to said main cage parts, means forming communicating relatively large drainage passages through the walls of said cage parts and said sleeve sections, a plurality of screen bars arranged side by side on the interior of each said sleeve section extending generally longitudinally thereof across said drainage passages, spacer means defining relatively small drainage openings between said screen bars, retainer means connected to said sleeve sections for holding said bars in said sections independently of any connection between said sleeve sections and said cage parts, said retainer means including center bars fastened to said sleeve sections at the longitudinally extending edges thereof and fastener devices extending through a portion of said cage parts and engaging the corresponding sleeve sections normally holding said insert sleeve sections respectively in fixed position in the corresponding said cage parts and releasable from the exterior of said cage parts providing for opening of said cage and removal and replacement of said insert sleeve sections with said screen bars and spacer means connected thereto as a complete sub-assembly.

2. In a screw press as defined in claim 1, means defining internal heat exchange fluid passages in the walls of said sleeve sections, and connector means on said sleeve sections for connecting said internal passages to a source of heat exchange of fluid.

3. In a screw press as defined in claim 1, structure for retaining said insert sleeve sections against rotation within the assembled cage parts including parts on said center bars projecting radially outward of each sleeve section, and slot means formed at the longitudinally extending edge of each of said main cage parts proportioned to receive said projecting parts of said center bars in the closed assembled position of said cage.

References Cited in the file of this patent

UNITED STATES PATENTS

| | | |
|---|---|---|
| 315,529 | McGowan | Apr. 14, 1885 |
| 366,165 | Gray | July 5, 1887 |
| 731,735 | Anderson | June 23, 1903 |
| 1,667,648 | Anderson | Apr. 24, 1928 |
| 1,694,114 | Anderson | Dec. 4, 1928 |
| 1,696,401 | Hiller | Dec. 25, 1928 |
| 1,828,968 | Hiller et al. | Oct. 27, 1931 |
| 2,138,670 | Upton | Nov. 29, 1938 |
| 2,223,514 | French | Dec. 3, 1940 |
| 2,262,566 | Upton | Nov. 11, 1941 |
| 2,320,765 | Upton | June 1, 1943 |
| 2,369,192 | Upton | Feb. 13, 1945 |
| 2,709,957 | Armstrong | June 7, 1955 |